Oct. 19, 1971 M. H. COOK ET AL 3,613,228

MANUFACTURE OF MULTIELEMENT MAGNETIC HEAD ASSEMBLIES

Filed July 2, 1969 2 Sheets-Sheet 1

*INVENTORS*
MILES H. COOK
WALTER NYSTROM
DUANE R. SECRIST
HAROLD L. TURK
BY Nathan N. Kallman
ATTORNEY

MANUFACTURE OF MULTIELEMENT MAGNETIC HEAD ASSEMBLIES

Filed July 2, 1969 2 Sheets-Sheet 2

3,613,228

MANUFACTURE OF MULTIELEMENT MAGNETIC HEAD ASSEMBLIES

Miles H. Cook, Walter Nystrom, Duane R. Secrist, and Harold L. Turk, San Jose, Calif., assignors to International Business Machines Corporation, Armonk, N.Y.

Filed July 2, 1969, Ser. No. 838,545
Int. Cl. H01f 7/06
U.S. Cl. 29—603 5 Claims

ABSTRACT OF THE DISCLOSURE

In the process of batch fabrication of multigap magnetic head assemblies, such as used in fixed head storage files, a nonmagnetic support structure is bonded to a magnetic ferrite body to facilitate grinding and polishing of the ferrite to desired dimensions, which represent track width and spacing, and gap length and throat height, inter alia. Conductors or wires are disposed in grooved portions of a magnetic ferrite back structure for electromagnetic coupling with the transducing gaps disposed in the front structure. Bonding glasses having three different flow temperatures are employed for joining the parts of the assembly, and the coefficients of thermal expansion of the several parts match within a narrow range.

CROSS-REFERENCE TO RELATED APPLICATION

In U.S. patent application 737,759, filed June 17, 1968, assigned to the same assignee, a multigap head assembly useful for fixed head disk files is described. The present invention teaches an improved method and means for manufacturing head assemblies of this type.

BACKGROUND OF THE INVENTION

Field of the invention

This invention relates to a novel and improved method and means of mass producing multi-element magnetic head assemblies.

Description of the prior art

In some magnetic recording systems, it is desirable to employ head assemblies having a multiplicity of transducing gaps which are fixed in position over defined record tracks of a magnetic medium. One material that is commonly used is magnetic ferrite, which has desirable characteristics for high frequency and high density recording. However, ferrite is basically brittle, and when undergoing grinding or polishing or the like, tends to chip, bend and deteriorate, if not properly machined. Furthermore, in multigap assemblies that are to be used with high density fixed head files, it is desirable that critical dimensions be precisely controlled, e.g., the transducing gaps should be substantially similar in length and evenly spaced from track to track.

SUMMARY OF THE INVENTION

An object of this invention is to provide a novel and improved method and means for batch fabrication of multi-element magnetic head assemblies.

Another object of this invention is to provide a method for forming multigap head assemblies having substantially precise dimensions and having an optimum track-to-track definition.

In a particular application of this invention, magnetic head assemblies, each having a multiplicity of uniformly spaced transducing gaps, are batch fabricated utilizing magnetic and nonmagnetic parts having coextensive planar surfaces. During manufacture, three different bonding materials, such as glasses having different flow temperatures, are employed to join the processed parts during different stages of the assembly. At first, a magnetic ferrite block is joined by a high temperature glass to a nonmagnetic block, which serves as a support while the magnetic block is lapped to a thickness corresponding to the desired data track widths. A multiplicity of such joined blocks is stacked and bonded together with the same high temperature glass, and the bonded stack is cut into sections containing alternately disposed magnetic and nonmagnetic layers. Pairs of these cut sections are bonded by a second glass having a melting temperature substantially lower than the high temperature glass. This latter glass forms a thin layer that serves as the effective transducing gaps in the final assembly. To complete the assembly, the bonded sections, which act as the front gap structure and provide an air bearing surface during noncontact transducing operation, are each joined by a relatively low flow temperature glass to a relatively thick magnetic ferrite back structure, having conductive elements disposed in grooves. In this manner, a novel magnetic head assembly is constructed, having a multiplicity of uniformly spaced transducing gaps associated with well-defined narrow magnetic track portions, and in addition providing an air bearing slider surface.

BRIEF DESCRIPTION OF THE DRAWINGS

The invention will be described in greater detail with reference to the drawing in which.

Similar numerals refer to similar elements throughout the drawing.

Description of a preferred embodiment

Figures 1, 2, 3, 4, 5, 6, 7, 8, 9:
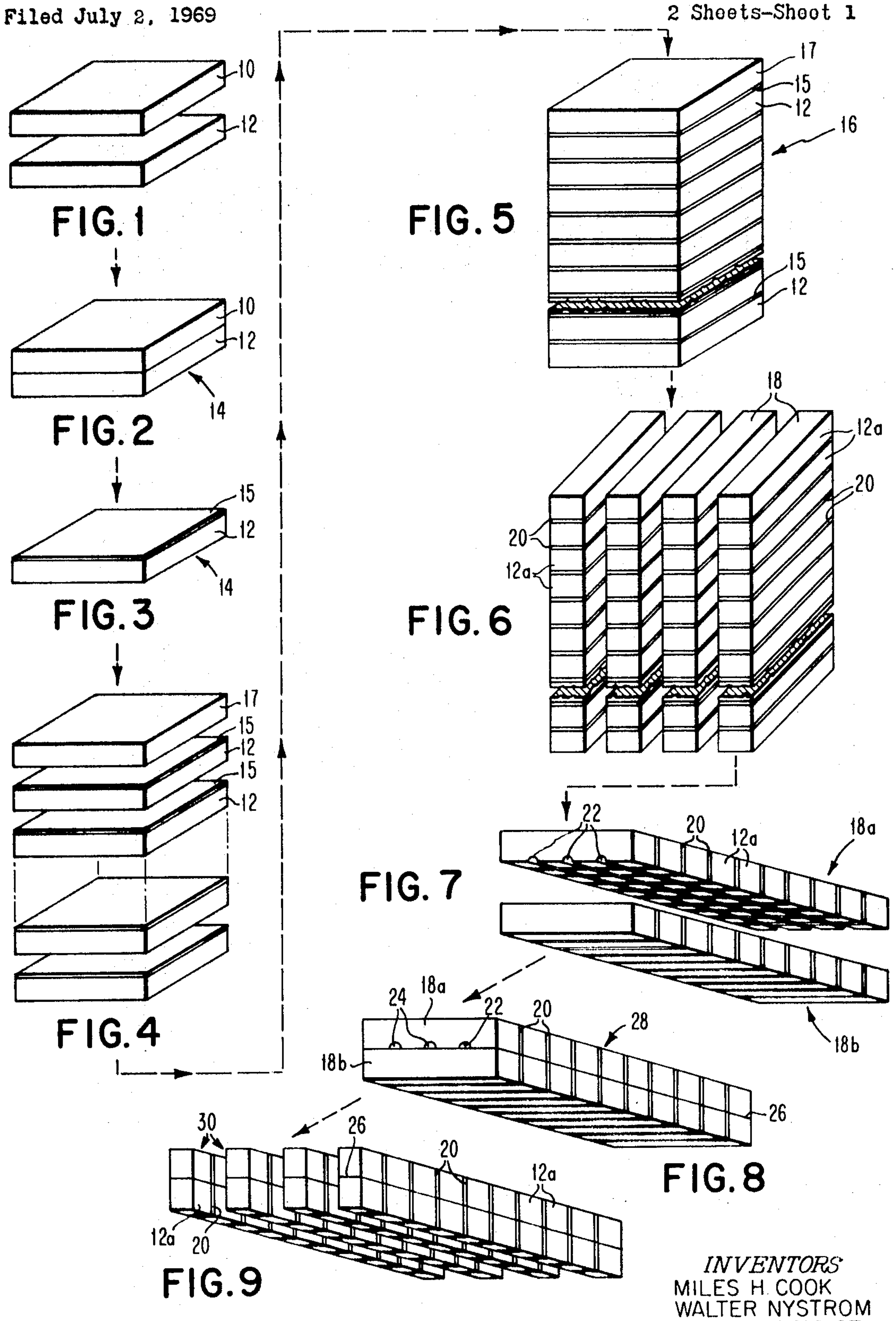
FIGS. 1–3 are isometric representations of the steps of joining magnetic and nonmagnetic blocks.
FIGS. 4–9 are isometric representations of the process of stacking, slicing, and forming the gap front structures.

With reference to the drawing, a multigap magnetic head assembly is mass produced by preparing magnetic and nonmagnetic ferrite sections 10 and 12 respectively, and joining the sections as shown in FIGS. 1 and 2. The magnetic ferrite section 10 is first prepared by dicing a section from a sintered bar and planetary lapping to a predetermined thickness such as 0.010 inch, for example. The resultant rectangular section 10 has substantially flat and parallel opposing surfaces. The nonmagnetic section 12 is formed from a nickel-zinc ferrite, by way of example, and has a coefficient of thermal expansion substantially close to that of the magnetic ferrite 10, particularly at the temperature range in which the final head assembly will operate. After lapping the two sections 10 and 12, they are glass bonded, using a high temperature bonding glass such as Corning 0211 or IBM 391 glass. The glass may be in a tape form, 0.0006 inch in starting thickness. To achieve the bonding, the two sections 10 and 12 are aligned in a lava ring and heated under e.g. 15 pounds per square inch loading. As a result, a glass bonded interface is formed, which is about 0.0002 inch in thickness. The magnetic section 10 of the sandwich assembly 14 is then lapped to define a desired narrow track width 15, as illustrated in FIG. 3.

The single track modules or assemblies 14 are assembled into a laminated stack and bonded with the same high temperature glass, as illustrated in FIGS. 4 and 5. The top magnetic section 15 is covered by a nonmagnetic section 17 to complete the stack. The bonded stack 16 is diced into a plurality of sections 18, each including multiple magnetic track portions 20, as well as nonmagnetic portions 12*a*, as shown in FIG. 6.

Half of the sections are grooved with longitudinal channels 22, and assembled to the other halves, with glass fibers 24 disposed in the channels as depicted in FIGS. 7 and 8. The grooved sections 18*a* are joined to similar, but ungrooved sections 18*b* by the glass 24, such as Corning 8161, having a lower flow temperature than the previously used high temperature glass. A nonmagnetic gap layer 26 (shown in FIG. 8) is established by the glass that fills the gap area by capillary soaking. The bonded module 28, including the gap layer 26, is sliced transversely to the ferrite track portions 20 to produce a number of front gap assemblies 30. These front gap assemblies 30 include a multiplicity of magnetic track portions 20 and nonmagnetic sections 12*a* interposed between the track portions. These assemblies 30 serve as pole pieces for the final magnetic head assembly.

Figure 10:
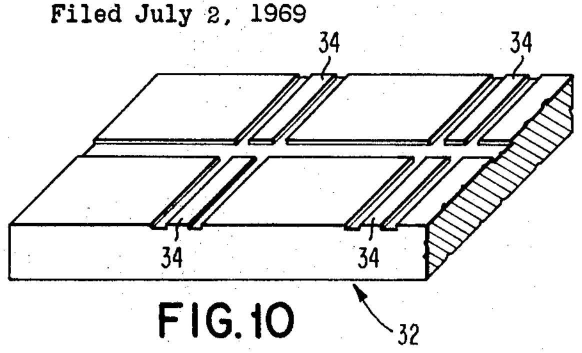
FIGS. 10–11 depict the preparation of a magnetic back structure, with conducting elements attached thereto.
Figure 11:
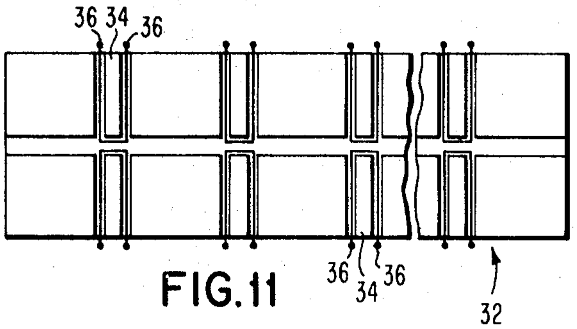

To complete the magnetic circuit of the multi-element head assembly, a back structure 32 (FIG. 10) is produced from a magnetic ferrite block, which is shaped to a rectangle having the same surface area as a front gap assembly 30. One surface is notched or grooved to produce lands 34, around which balanced single-turn conductive wires 36 are fastened, as depicted in FIG. 11. For example, silver wires may be bonded into the slots by a relatively low temperature glass such as Corning 7570, with the wire ends projecting for connection to a read-write circuit.

Figure 12:
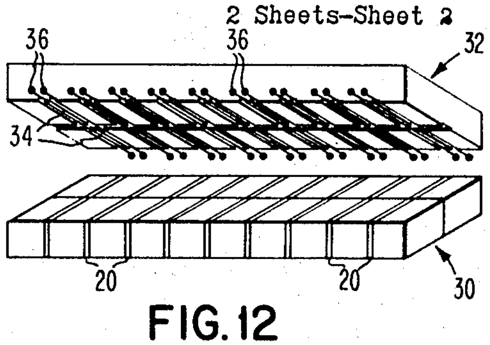
FIGS. 12–14 illustrate the joinder of the front gap structure and the magnetic back structure to produce the multigap assembly.
Figure 13:
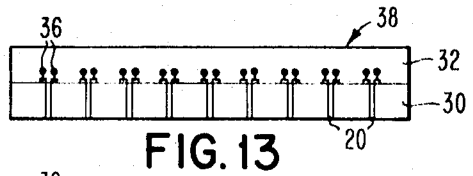
Figure 14:
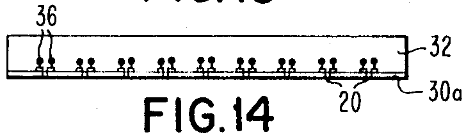
Figure 15:
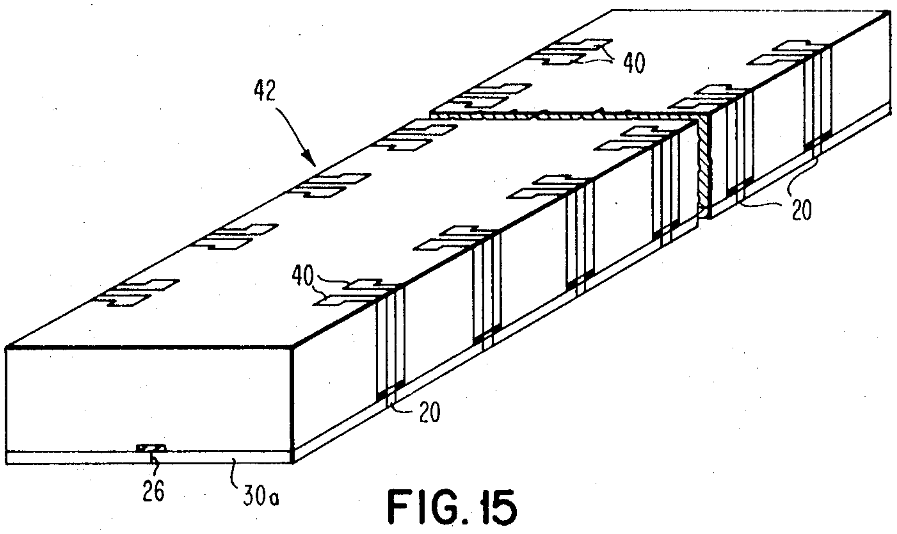
FIG. 15 is an isometric view of a multigap magnetic head slider assembly, such as may be used in a fixed head file, in accordance with this invention.

As illustrated in FIG. 12, the wire back structure 32 is then attached to a front gap structure 30 by positioning and holding the wired surface of the back structure 32 to a coextensive surface of front gap assembly in contiguous relation, while heating the assembly to a temperature that causes only the low temperature Corning 7570 glass to flow, but not sufficient to flow the other two bonding glasses of higher flow temperature. The front gap structure 30 of the combination 38 (FIG. 13) is then ground down to a desired thickness 30*a* to establish the gap throat height. Copper or silver leads 40 are deposited and connected to the projecting conductive wires 36 to provide ready access to terminals of a matrix of read-write circuitry. The completed, wired multigap transducer structure 42 is shown in FIG. 15, ready for assembly into a magnetic storage apparatus.

The process disclosed facilitates batch fabrication of glass bonded multi-element ferrite recording heads. The configuration of the device produced by the novel process of this invention affords very narrow track widths, in the order of 1–2 mils in thickness, heretofore unobtainable by conventional batch fabication pocesses. Also, the novel design allows use of the front gap structure as a flying surface for noncontact recording, and does not require additional structure or housing to enable air bearing operation. The availability of backing support during polishing and processing of the different assemblies minimizes warpage, breakage, and chipping, and reduces loss of worked parts; and permits establishing a suitable throat height similarly for the multiplicity of transducer elements. The process and design disclosed herein take advantage of parallelism of the various elements being assembled, so that a planar reference surface is always available for control of dimensions. The manner of assembly lends itself to automatic operation, and yet small dimensions can be realized without difficulty.

It is understood that the scope of this invention is not limited to the particular materials or parameters set forth above. For example, nonmagnetic ceramic may be used for the nonmagnetic ferrite, and other bonding agents may be employed instead of glass. The ceramic may be white in color to present a visual contrast to the black magnetic ferrite track portions, and thereby indicate the spacing of the data tracks. Conductive elements instead of wires can be deposited by thin film evaporation, paint brushing, or the like, in the grooved back structure, to provide electrical leads. The materials used preferably are characterized by coefficients of thermal expansion that are within a close range, thus ensuring stability during operation. In addition, the step of joining the magnetic and nonmagnetic sections 10 and 12, as depicted in FIGS. 1 and 2, may be accomplished by diffusion bonding, thereby eliminating the need for the high temperature glass. However, to achieve suitable diffusion bonding, the opposing surfaces need to be ground, lapped, and polished prior to bonding. The advantage of diffusion bonding is that improved dimensional control is attainable.

While the invention has been particularly shown and described with reference to a preferred embodiment thereof, it will be understood by those skilled in the art that various changes in the form and details may be made therein without departing from the spirit and scope of the invention.

What is claimed is:

1. A method of batch fabrication of multigap magnetic head assemblies comprising the steps of:

forming and joining at least four alternating magnetic and nonmagnetic layers into a stack;

slicing said stack across the layers to form sections having spaced magnetic portions, the thickness of each magnetic portion defining the width of a record track;

joining one section to another section, with the magnetic portions of the one section confronting the magnetic portions of the another section, with a nonmagnetic bonding material, said material establishing a transducing gap betwen said two sections;

cutting such joined sections transversely to said transducing gap and said magnetic portions to form at least three multigap front assemblies; and attaching a wired unitary magnetic back structure to each front assembly to complete the magnetic circuit for each transducing gap associated with each magnetic layer.

2. A method as in claim 1, including the steps of joining individual magnetic and nonmagnetic blocks into a subassembly and joining a plurality of said subassemblies to form said stack, and lapping at least one subassembly to a desired narrow thickness.

3. A method as in claim 1, including prior to the step of attaching the back structure the steps of forming grooves in segments of said back structure and securing conductive elements within the grooves, each segment associated with a discrete transducing gap, each gap being coupled to a conductive element that is isolated from the other conductive elements.

4. The method as in claim 3, wherein said conductive elements are secured within said grooves by a glass and the step of attaching the back structure to the front assembly includes the step of heating said glass above its melting temperature.

5. The method as in claim 1, including the steps of grooving said one section with a longitudinal channel perpendicularly across the magnetic and nonmagnetic layers prior to the step of joining said one section to said another section, and placing said bonding material in the grooves, and heating said bonding material above its melting point so that the material flows across the boundary between said one section and said another section, said sections becoming joined when said bonding material cools.

References Cited

UNITED STATES PATENTS

| | | | |
|---|---|---|---|
| 3,126,615 | 3/1964 | Duinker | 29—603 |
| 3,353,261 | 11/1967 | Bradford et al. | 29—603 |
| 3,458,926 | 8/1969 | Maissel et al. | 29—603 |
| 3,478,340 | 11/1969 | Schwartz et al. | 29—603 X |

JOHN F. CAMPBELL, Primary Examiner

C. E. HALL, Assistant Examiner

U.S. Cl. X.R.

29—411; 156—260, 264; 179—100.2 C